(12) United States Patent
Lee et al.

(10) Patent No.: US 7,079,681 B2
(45) Date of Patent: Jul. 18, 2006

(54) IMAGE QUALITY ANALYSIS METHOD AND SYSTEM FOR A DISPLAY DEVICE USING FRACTAL DIMENSION

(75) Inventors: Don Gyou Lee, Gyeongsangbuk-do (KR); Jung Ho Kil, Gyeongsangbuk-do (KR); Ki Yeon Song, Gyeonggi-do (KR); Moon Chul Jeong, Gyeongsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 754 days.

(21) Appl. No.: 10/331,721

(22) Filed: Dec. 31, 2002

(65) Prior Publication Data

US 2003/0215131 A1    Nov. 20, 2003

(30) Foreign Application Priority Data

May 18, 2002    (KR)    ................. 2002-27645

(51) Int. Cl.
*G06K 9/00*    (2006.01)

(52) U.S. Cl. ............. 382/162; 382/173; 382/190; 356/301

(58) Field of Classification Search ........... 382/162, 382/167, 173, 190, 206, 207, 189, 214, 274; 348/93, 14.07, 333.12, 658; 345/698, 208, 345/22, 23, 24, 37–40; 356/2–958
See application file for complete search history.

(56) References Cited

U.S. PATENT DOCUMENTS

| 5,671,294 A | * | 9/1997 | Rogers et al. ............... 382/228 |
| 5,732,158 A | * | 3/1998 | Jaenisch .................... 382/249 |
| 5,867,603 A | * | 2/1999 | Barnsley et al. ............ 382/249 |
| 5,917,541 A | * | 6/1999 | Nakagome et al. .......... 348/93 |
| 6,993,187 B1 | * | 1/2006 | Recht ......................... 382/181 |
| 2002/0025063 A1 | * | 2/2002 | Jiang et al. ................. 382/132 |

FOREIGN PATENT DOCUMENTS

JP    08-297054    11/1996

* cited by examiner

*Primary Examiner*—Jingge Wu
*Assistant Examiner*—Ali Bayat
(74) *Attorney, Agent, or Firm*—Morgan, Lewis & Bockius, LLP (57) ABSTRACT

An image quality analysis method and an image quality analysis system for a display device are provided. The image quality analysis method for a display device includes the steps of outputting an image pattern for analysis of an image quality of the display device, dividing a screen display region to which the image pattern is output into a plurality of sub-regions, producing measurement data representing the image quality with respect to each of the plurality of sub-regions, arranging the produced measurement data as a time series, obtaining a fractal dimension exponent from the data as a time series, and evaluating the fractal dimension exponent as a level of uniformity of the image quality of the display device.

24 Claims, 6 Drawing Sheets

IMAGE QUALITY ANALYSIS METHOD AND SYSTEM FOR A DISPLAY DEVICE USING FRACTAL DIMENSION

The present invention claims the benefit of Korean Patent Application No. 2002-27645 filed in Korea on May 18, 2002, which is hereby incorporated by reference.

BACKGROUND OF THE INVENTION

1. Field of the Invention

The present invention relates to an image quality analysis method and an image quality system, and more particularly, to an image quality analysis method and an image quality system for a display device using the fractal dimension by which a level of image quality for display devices can be quantified by objective numerical values.

2. Description of the Related Art

Improved display devices are being developed using technologies such as those of cathode ray tubes, liquid crystal displays, plasma display panels, organic EL (Electro Luminescence) display devices, etc. Especially, liquid crystal displays are being spotlighted as being the display devices of the next generation because of their low power consumption, light weight, reduced thickness, and low harmful electromagnetic emission.

In the related art, an image quality inspection for flat display devices such as those mentioned above, for example, the liquid crystal device, comprised turning on a liquid crystal panel and analyzing a level of image quality of the liquid crystal display using the naked eye of an operator. However, such an image quality inspection using the naked eye of the operator can produce differences between check results due to different skill levels of the operators. In addition, even in the check by same operator, a level of precision of the check may not be uniform due to the operator's different physical conditions at different points of time. Accordingly, objective numerical values cannot be provided for the image quality of display device inspected by the naked eye, and further subjective of the operator may intervene in the inspection.

In particular, when the uniformity of image quality of the display device is inspected, even at one time by same operator, there occurs a significant difference in the evaluation of uniformity of image quality. In addition, as the subjectivity of the operator intervenes in the evaluation of image quality of the display device, it is difficult to propose an objective and fair evaluation criterion between manufacturers and purchasers of the display device.

SUMMARY OF THE INVENTION

Accordingly, the present invention is directed to an image quality analysis method and an image quality analysis system that substantially obviate one or more of the problems due to limitations and disadvantages of the related art.

An object of the present invention is to provide an image quality analysis method and system using the fractal dimension by which a level of image quality for display devices can be quantified by objective numerical values, so that an objective evaluation can be carried out.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an image quality analysis method for a display device comprises the steps of outputting an image pattern for analysis of an image quality of the display device; dividing a screen display region to which the image pattern is output into a plurality of sub-regions; producing measurement data representing the image quality with respect to each of the plurality of sub-regions; arranging the produced measurement data as a time series; obtaining a fractal dimension exponent from the data as a time series; and evaluating the fractal dimension exponent as a level of uniformity of the image quality of the display device.

In another aspect, an image quality analysis system for a display device of which image quality is to be analyzed comprises an image acquisition means for detecting optical data of an image to be displayed from the display device; a data processing means for producing measurement data representing the image quality of the display device using the optical data detected by the image acquisition means and for constructing the produced measurement data as a time series; and an exponent calculating means for obtaining a fractal dimension exponent of the display device using the time series constructed by the data processing means.

In another aspect, an image quality analysis system for a display device of which image quality is to be analyzed comprises an image acquisition device to detect optical data of an image to be displayed from the display device; a data processor to produce measurement data representing the image quality of the display device using the optical data detected by the image acquisition device and to construct the produced measurement data as a time series; and an exponent calculator to obtain a fractal dimension exponent of the display device using the time series constructed by the data processor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DESCRIPTION OF THE PREFERRED EMBODIMENTS

Reference will now be made in detail to the preferred embodiments of the present invention, examples of which are illustrated in the accompanying drawings.

For an analysis of quality uniformity of image displayed on a screen of a display device, under an assumption that the displayed image is in a chaos condition with nonlinear characteristics, a method can provide objective numerical values for the uniformity of image quality producing a fractal dimension exponent. In the verification of such an assumption, it was confirmed that data (luminance, chromaticity, and color difference) produced for the analysis of image quality of the display device were in the chaos condition, as assumed in the present invention, by constructing strange attractors for a plurality of image samples using the produced data (luminance, chromaticity, and color difference), which will be in detail described later. Then, prior to the description about an image quality analysis method and system using the fractal dimension according to the present invention, a concept of "fractal" discussed here will be explained as follows.

When an original figure is successively divided into smaller figures similar to the original figure, if the number of fragments (i.e., self-similarity figures) generated by such a division is set to N and a reduction rate of one side of a divided figure is set to r, a fractal dimension D maybe defined as Equation 1:

$$N \times r^D = 1 \tag{1}$$

Rearranging this equation, the fractal dimension D can be expressed as shown in Equation 2:

$$D = \frac{\log N}{\log \frac{1}{r}} \tag{2}$$

As one example, the fractal dimension for a line segment expressed by the length of a straight line will be obtained. When a line segment of unit length is divided into N parts having the same length, the reduction r can be expressed as 1/N. Then, when the fractal dimension D is calculated by Equation 2, $D=(\log N/\log(1/r))=\log N/\log N=1$. As can be seen from this, the fractal dimension for the line segment expressed by the length of the straight line is one-dimensional similar to those known in Euclidean geometry.

As another example, the fractal dimension for a square expressed by a plane will be obtained. When both sides of a square whose sides have unit length are divided into k parts having same length, $k^2$ self-similarity squares are generated. Also, the reduction r can be expressed as 1/k. Then, when the fractal dimension D is calculated by Equation 2, $D=(\log N/\log(1/r))=\log(k^2)/\log k=2$. As can be seen from this, the fractal dimension for the square expressed by the plane is two-dimensional similar to those known in Euclidean geometry.

Figure 1:
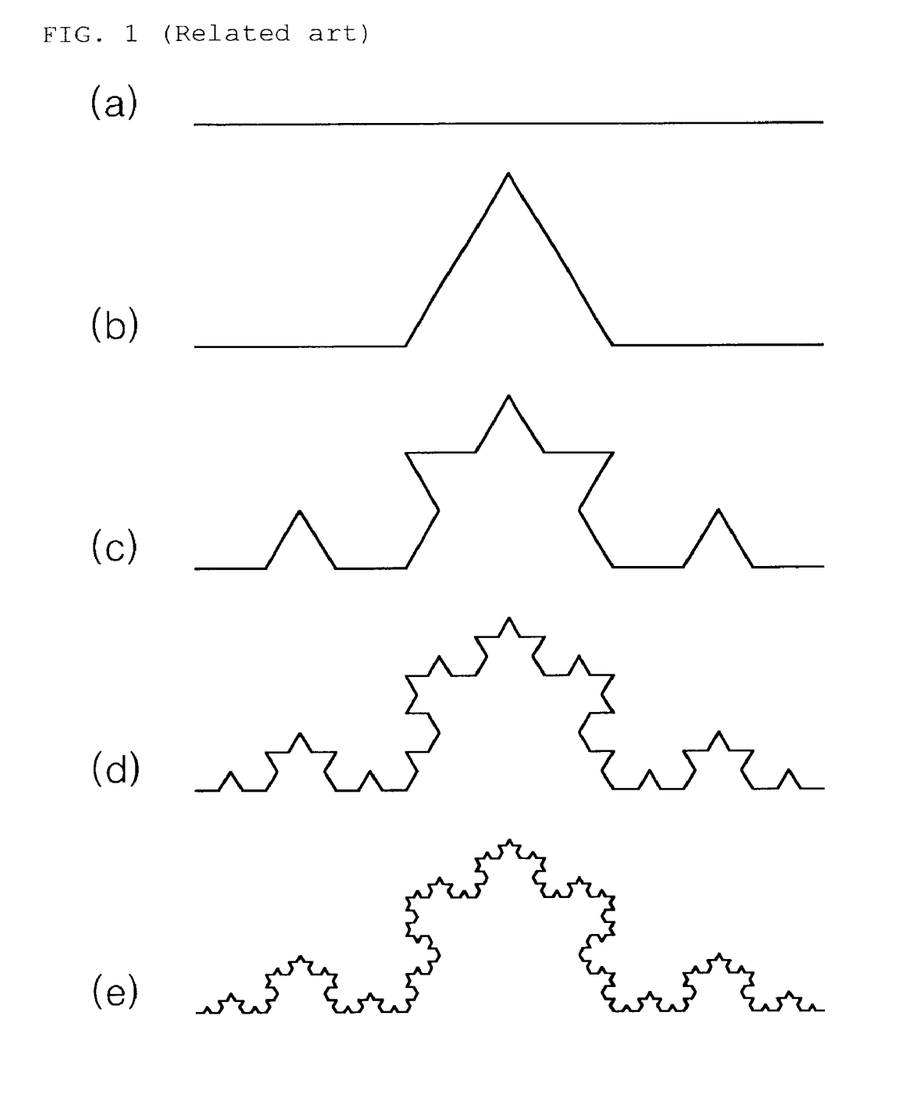
FIGS. 1a to 1e are views showing a procedure of obtaining a Koch curve for explaining a fractal dimension.

Now, the fractal dimension for the Koch curve shown in FIG. 1e will be obtained.

First, a procedure of constructing the Koch curve is explained. As shown in FIG. 1a, a straight line of a prescribed length is drawn. Next, the length of the straight line shown in FIG. 1a is divided into three equal parts and an equilateral triangle is drawn in the middle one of the three parts. Then, when the bottom side of the equilateral triangle is erased, four line segments are connected to form a curve as shown in FIG. 1b (a first construction). Next, when the first construction is iteratively performed for each of the four line segments having a same length, 16 line segments are connected to form a curve as shown in FIG. 1c (a second construction). Therefore, when the second construction is iteratively performed for each of the 16 line segments having the same length, 64 line segments are connected to form a curve as shown in FIG. 1d (a third construction). As a result of an iterative performance of the construction as described above, the Koch curve as shown in FIG. 1e can be obtained.

On the other hand, although existing Euclidean geometry seeks to express all things with a smooth shape (straight line, circle, ellipse, hyperbola, parabola, etc.), actual natural phenomenon is made up of complex curved shapes. For example, clouds floating in the air, or trees, flowers, mountains, rivers, etc. on the ground, etc. do not have smooth shapes but complex curved shapes in Euclidean geometry.

The length of a straight line or smooth curve in Euclidean geometry can be measured. However, although the Koch curve as shown in FIG. 1e is not an infinite extending curve, the length of the Koch curve cannot be measured since the length becomes infinitely large as the construction continues infinitely. Therefore, the Koch curve does not represent a one-dimensional object such as a straight line in Euclidean geometry. Moreover, the area of the Koch curve cannot be measured. The Koch curve actually assumes an intermediate property between one and two-dimensions.

The numerical value representing such a property is 1.26, which is expressed as the fractal dimension of the Koch curve. This numerical value can be obtained by Equation 2 as follows. That is, since the number of similar fragments N is 4 and the reduction rate r is ⅓, it can be seen that the fractal dimension D of the Koch curve=$(\log N/\log(1/r))=\log 4/\log 3=1.261859$....

As described above, the fractal curve such as the Koch curve has a dimension between one and two because of its intermediate property between the straight line and the plane. Here, the fractal curve having a dimension approaching 1 has a smooth shape close to the straight line. In contrast, the fractal curve having a dimension approaching 2 has a curved shape growing to fill the plane while moving about in the plane.

In addition, when the dimension of the fractal curve is two, the fractal curve fills up the plane. Similarly, as the dimension of the fractal curve approaches 3, the fractal curve has a serious curved shape growing to fill a space while moving here and there in the space. That is, the fractal dimension has a numerical value expressed not by an integer but by a decimal for quantifying a degree of meandering, a rate of hollowing, etc. of geometrical structures having self-similarity. Here, such a fractal dimension represents a complexity of a system.

In addition, the fractal dimension, which is a new geometry capable of describing and analyzing a structural irregularity of nature, provides a novel means for describing quantificational chaos phenomenon revealed in various shapes in the dynamics. A dynamical system, which is expressed by nonlinear equations, shows a regular movement or a chaotic movement depending on parameters characterizing the system. When an aspect of movement of the system during a long period is shown as the chaotic movement, i.e., the strange attractor, the geometrical shape of the system has the fractal structure.

In the present invention, by selecting proper parameters with reference to the above explanation, a level of quality of an image displayed in the display device could be represented by the chaos phenomenon, and, therefrom, a method of providing objective numerical values by which a level of uniformity of image quality can be expressed could be suggested.

Hereinafter, the present invention will be described in detail through embodiments with reference to the accompanying drawings.

Figure 2:
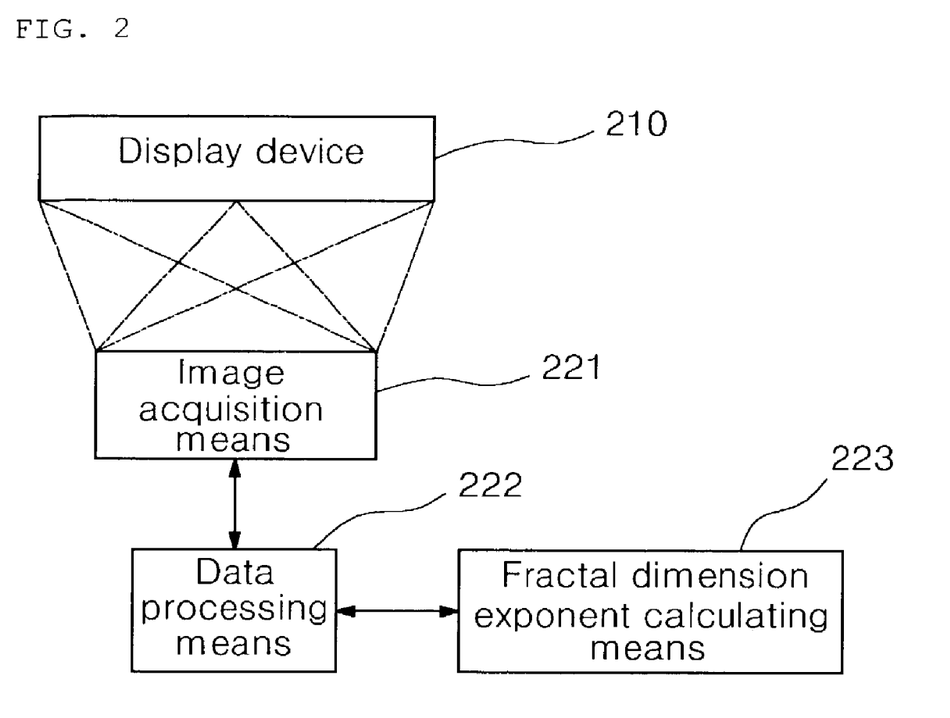
FIG. 2 is a schematic view for illustrating a structure of an image quality analysis system of a display device using a fractal dimension according to an exemplary embodiment of the present invention.

FIG. 2 is a schematic view for illustrating a structure of an image quality analysis system of a display device using a fractal dimension according to an exemplary embodiment of the present invention.

Referring to FIG. 2, an image quality analysis system for a display device using the fractal dimension according to the present invention comprises an image acquisition portion 221 for detecting optical data of an image to be displayed from the display device 210, such as, a liquid crystal device, a plasma display panel, an organic EL display device, etc. whose image quality is to be analyzed; a data processing portion 222 for producing measurement data corresponding to the image quality of the display device 210 using the optical data detected by the image acquisition portion 221 and constructing the produced measurement data as a time series; and an exponent calculating portion 223 for obtaining a fractal dimension exponent of the display device using the time series data constructed by the data processing portion 222.

The image acquisition portion 221 may include 2-CCD (Charge Coupled Device) luminance meter & colorimeter, etc. to detect luminance data and chromaticity data from each detection region (for example, each pixel unit) of the display device 210.

Figure 3:
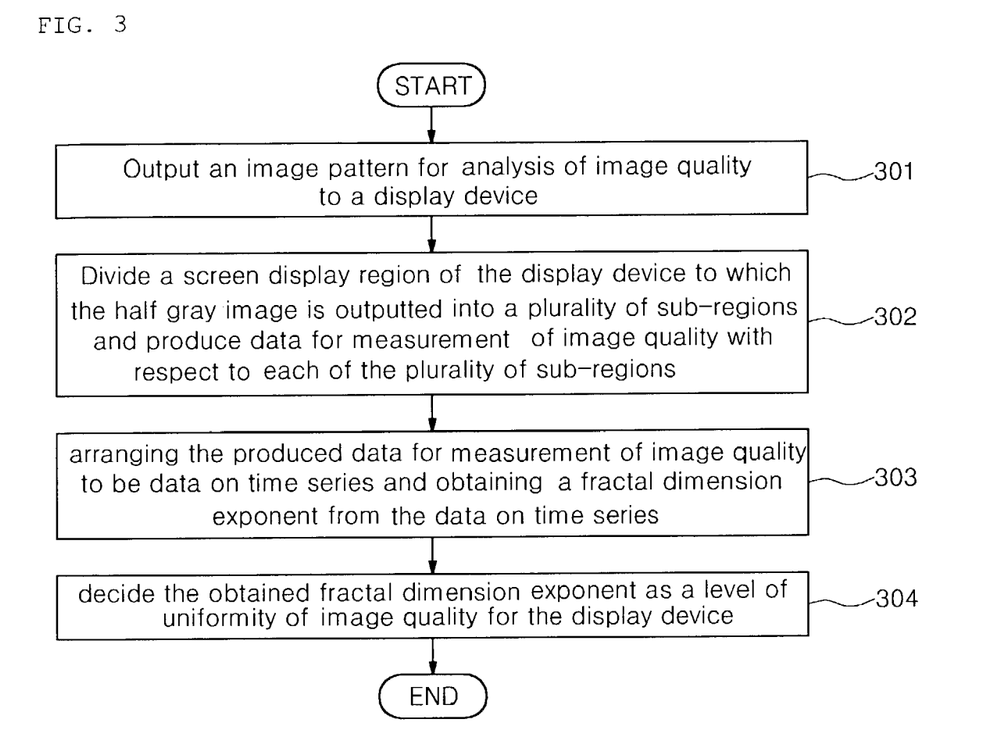
FIG. 3 is a flow chart for explaining a procedure of an image quality analysis for a display device through an image quality analysis method for the display device using the fractal dimension according to an exemplary embodiment of the present invention.
Figure 4:
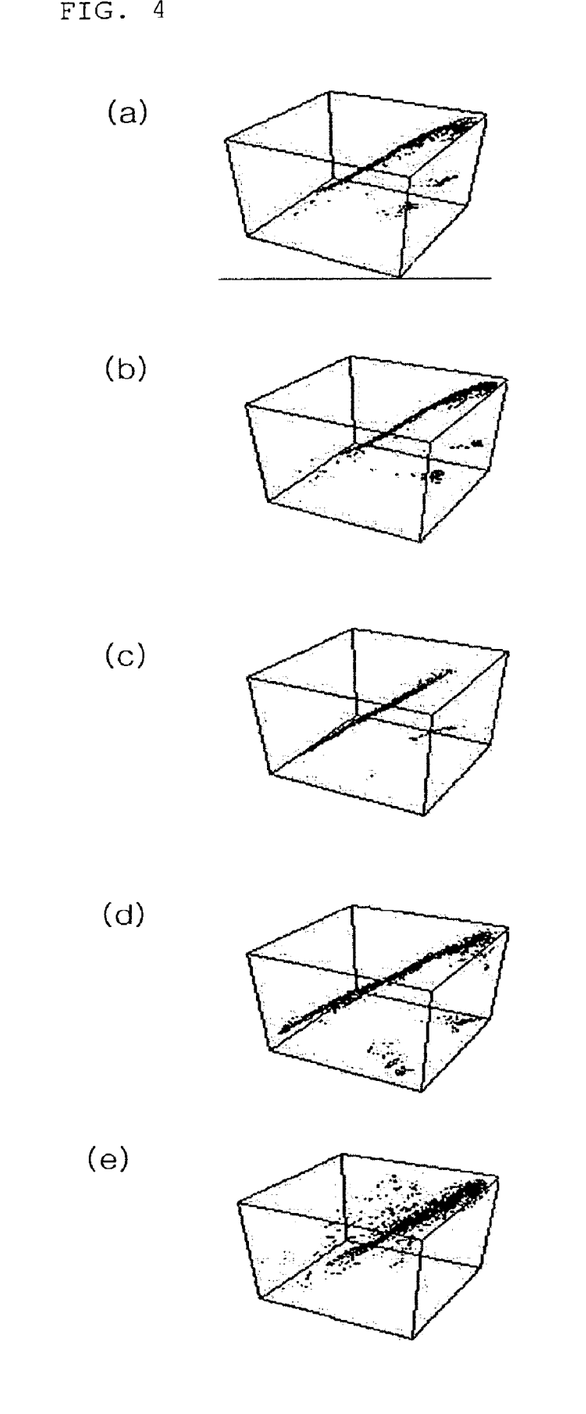
FIGS. 4a to 4e are schematic views showing strange attractors constructed from image quality measurement data produced from the display device through an image quality analysis method for the display device using the fractal dimension according to an exemplary embodiment of the present invention.

Now, referring to FIG. 3, an image quality analysis method for the display device using the fractal dimension according to the present invention will be described in detail. FIG. 3 is a flow chart for explaining a procedure of an image quality analysis for a display device through an image quality analysis method for the display device using the fractal dimension according to an exemplary embodiment of the present invention.

First, a prescribed image pattern for analysis of image quality is output to the display device (Step 301). At that time, the image pattern output to the display device can be implemented in various ways through an image pattern generator, etc (even in case of same image pattern, the luminance for each image pattern can be different as, for example, black gray, half gray, full gray, etc.). Here, an exemplary case with the image pattern being output as the half gray image pattern type with respect to the entire screen will be explained.

After Step 301, a screen display region of the display device to which the half gray image is output is divided into a plurality of sub-regions and data for measurement of image quality with respect to each of the plurality of sub-regions are produced (Step 302). Here, as the data for measurement of image quality produced with respect to each of the plurality of sub-regions, either luminance or chromaticity data are basically available. At that time, basic optical luminance and chromaticity data can be detected from the display device using an image acquisition portion such as the 2-CCD luminance meter & calorimeter.

Here, the luminance data detected from the screen region of the display device can be expressed by the following matrix form depending on a detection position.

$$\begin{bmatrix} L_{11} & L_{12} & \ldots & L_{1n} \\ L_{21} & L_{22} & \ldots & L_{2n} \\ \ldots & \ldots & \ldots & \ldots \\ L_{m1} & L_{m2} & \ldots & L_{mn} \end{bmatrix}$$

Also, the chromaticity data detected from the screen region of the display device can be expressed by the following matrix form depending on a detection position.

$$\begin{bmatrix} (x, y)_{11} & (x, y)_{12} & \ldots & (x, y)_{1n} \\ (x, y)_{21} & (x, y)_{22} & \ldots & (x, y)_{2n} \\ \ldots & \ldots & \ldots & \ldots \\ (x, y)_{m1} & (x, y)_{m2} & \ldots & (x, y)_{mn} \end{bmatrix}$$

In addition, with reference to the optical luminance/chromaticity data detected through the image acquisition, color difference ($\Delta Euv$) data representing a difference of color sense felt by humans is calculated, and the calculated color difference data can be used to perform the image quality analysis for the display device. At that time, when the color difference data is obtained, a particular point, for example, a center point in the screen display region can be selected as a reference point.

Further, when the data for measurement of image quality is calculated from the display device, the screen display region is divided into pixel units, and the data for measurement of image quality can be calculated with respect to the pixel units. In addition, of the pixel units, the data for measurement of image quality can be calculated with respect to each pixel unit positioned at prescribed equal intervals from a basis pixel. This calculation takes into consideration that data is commonly extracted at equal time intervals during a procedure of analysis of the nonlinear dynamical system. In the present invention, the data produced in the screen display region of the display device were considered and processed as data on a time series. Therefore, a screen output is performed by a scan of scanning signal for image display.

Then, using the luminance data and the chromaticity data detected through the image acquisition means. A procedure of producing the color difference ($\Delta Euv$) data will now be explained. Here, in producing the color difference data, the following equations are produced with reference to VESA FPDM (Flat Panel Display Measurement) V.2.0.

$$L^* = 116 \times \left(\frac{Y'}{Y_n}\right)^{1/3} - 16$$

$$\Delta L^* = L^*_1 - L^*_2$$

$$u^* = 13 \times L^* \times (u' - u'_w)$$

$$v^* = 13 \times L^* \times (v' - v'_w)$$

$$\Delta u^* = u^*_1 - u^*_2, \Delta v^* = v^*_1 - v^*_2$$

$$\Delta Euv = [(\Delta L^*)^2 + (\Delta u^*)^2 + (\Delta v^*)^2]^{1/2}$$

With reference to the above produced luminance data and chromaticity data of the display device, the color difference (ΔEuv) data produced from the screen display region can be expressed by the following matrix form:

$$\begin{bmatrix} \Delta Euv_{11} & \Delta Euv_{12} & \ldots & \Delta Euv_{1n} \\ \Delta Euv_{21} & \Delta Euv_{22} & \ldots & \Delta Euv_{2n} \\ \ldots & \ldots & \ldots & \ldots \\ \Delta Euv_{m1} & \Delta Euv_{m2} & \ldots & \Delta Euv_{mn} \end{bmatrix}$$

In the present invention, the uniformity of image quality for five display devices was measured. The strange attractors for each display device are shown in FIGS. 4a to 4e. FIGS. 4a to 4e are exemplary views showing strange attractors constructed from the image quality measurement data (ΔEuv) produced from each display device (#1–#5) through an image quality analysis method for the display device using the fractal dimension.

As shown in FIGS. 4a to 4e, each strange attractor shows different shapes, and, therefore, it can be seen that each display device shows different properties. However, from the shape of the constructed strange attractor, it can be seen that all the color difference (ΔEuv) data produced from each of the display devices represent the chaos condition. In general, data representing a characteristic of chaos condition (chaotic data) are expressed as a special orbit in the space and data representing a characteristic of non-chaos condition (non-chaotic data) are indicated in a scattering way in the space.

Through the procedure of Step 302 described above, when the data (luminance, chromaticity, and color difference) for measurement of image quality for each display device are produced, the produced data are considered and arranged as data on time series from which the fractal dimension exponent is obtained (Step 303).

Next, the fractal dimension exponent obtained in Step 303 is decided as a level of uniformity of image quality for each display device (Step 304). Here, in such a decision, it is estimated that the lower the fractal dimension exponent is, the lower the complexity of image quality for the display device is and the higher the uniformity of image quality is.

Although obtaining the fractal dimension exponent using the color difference data has been explained as one example, in addition to this, the chaos condition could also be seen by using the luminance data or the chromaticity data from which the fractal dimension exponent can be obtained.

Figure 5:
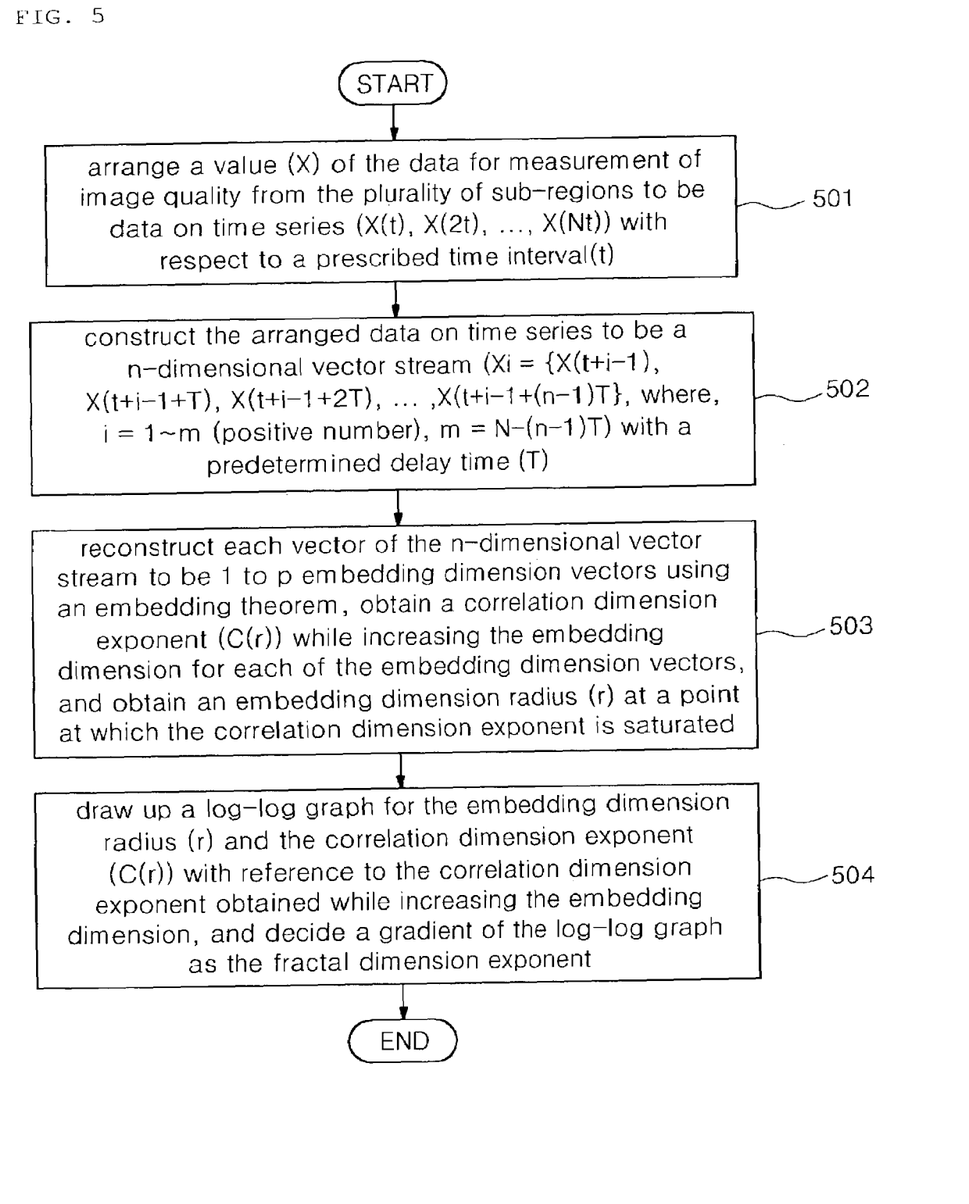
FIG. 5 is a flow chart for explaining a procedure of obtaining a fractal dimension exponent through an image quality analysis method for the display device using the fractal dimension according to an embodiment of the present invention.

Then, the procedure of obtaining the fractal dimension exponent in Step 303 will be in more detail described with reference to FIG. 5. FIG. 5 is a flow chart for explaining a procedure of obtaining a fractal dimension exponent through an image quality analysis method for the display device using the fractal dimension according to an exemplary embodiment of the present invention.

First, the data X for measurement of image quality produced from each of the divided screen display regions in Step 302 are considered and arranged as data on time series X(t), X(2t), . . . , X(Nt) with respect to a prescribed time interval t (Step 501). Such data on a time series can also be arranged for each of the luminance data and the chromaticity data or the color difference data produced from the luminance data and the chromaticity data. Here, the term "data on time series" used herein is generally a term used in consideration of a temporal variation in the non-linearly dynamical system.

Figure 6:
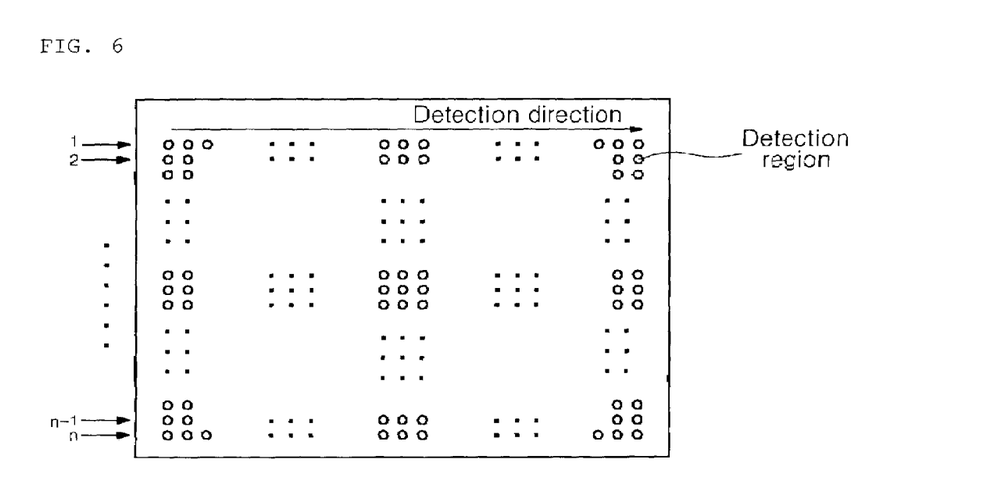
FIG. 6 is a conceptual view for explaining a detection sequence of the image quality measurement data through an image quality analysis method for the display device using the fractal dimension according to an exemplary embodiment of the present invention.

In addition, as shown in FIG. 6, this term also means data extracted in order depending on a position to be measured, and includes a meaning of image display in accordance to scan signals. FIG. 6 is a conceptual view for explaining a detection sequence of the image quality measurement data through an image quality analysis method for the display device using the fractal dimension according to an exemplary embodiment of the present invention.

As shown in FIG. 6, the data for measurement of image quality is detected for each of the divided screen display regions from the left of the screen to the right of the screen in a first row, and subsequently, the data for measurement of image quality are detected for each of the divided screen display regions from the left of the screen to the right of the screen in next row. However, actually, the optical data detection for each of the divided display regions is simultaneously performed (when detection time of the optical data and scan speed for image display are considered). Merely, when the data for measurement of image quality are produced and arranged in processing the data according to the present invention, the detection position of the optical data is to be considered, as shown in FIG. 6.

The data for measurement of image quality, for example, the color difference data, measured through such a procedure can be arranged, as expressed by the following equation.

$$\Delta Euv(x) = \{x(1), x(2), \ldots, x(n)\}$$

In addition, with reference to the data for measurement of image quality measured for each of the divided display regions, data to be used for an actual calculation (image quality measurement for the display device) with a prescribed time interval can be selectively extracted, which can be expressed in the form of time series when representing in consideration of temporal variation. That is, the data to be used for an actual calculation can be arranged as data on time series X(t), X(2t), . . . , X(Nt) with respect to a prescribed time interval t.

Then, the arranged data on time series are constructed as an n-dimensional vector stream Xi={X(t+i−1), X(t+i−1+T), X(t+i−1+2T), . . . ,X(t+i−1+(n−1)T)} where, i=(1−m)T with i being a positive number and m=N−(n−1) with a prescribed delay time T (Step 502).

Here, the prescribed delay time T is set to integral times as long as the prescribed time interval t. In the analysis of the fractal dimension, this delay time T has an important meaning to be carefully selected to obtain a meaningful result.

In connection with the setting of the delay time T in the present invention, a case that the fractal dimension exponent is calculated using '4' used frequently in the analysis of the fractal dimension will be explained.

On the other hand, the n-dimensional vector stream arranged with the prescribed delay time T in Step 502 can be concretely expressed as follows:

$$X1 = \{X(t), X(t+T), X(t+2T), \ldots, X(t+(n-1)T)\}$$

$$X2 = \{X(t+1), X(t+1+T), X(t+1+2T), \ldots,$$

$$X(t+1+(n-1)T)\}$$

$$\ldots$$

$$Xm = \{X(t+m-1), X(t+m-1+T), X(t+m-1+2T),$$

$$\ldots, X(t+m-1+(n-1)T)\}$$

Then, each vector of the n-dimensional vector stream is reconstructed as 1 to p embedding dimension vectors using Takens's embedding theorem, the correlation dimension exponent C(r) is obtained for each of the embedding dimension vectors while increasing the embedding dimension, and the radius r of the embedding dimension at a point where the correlation dimension exponent is saturated is obtained (Step 503). Here, the embedding dimension is referred to as a dimension reconstructing vectors from 1 to p dimension with respect to each vector of the n-dimensional vector stream. An additional explanation on this can be given as follows. For example, it is assumed that N data represented by X(1), X(2), X(3), . . . , X(N) with respect to a parameter X are obtained by sampling the parameter X at the time interval t. At the time, when the delay time T is taken as twice as long as the sampling time interval t (T=2t), the vector stream whose embedding dimension is 3 (three vectors forms one group) can be obtained as follows:

$$\{X(1),X(3),X(5)\},\{X(2),X(4),X(6)\},\{X(3),X(5),X(7)\}, \ldots,$$
$$\{X(N-4),X(N-2),X(N)\}$$

When points fixed to be dotted in three-dimensional space, three-dimensional attractors showing movement property of an original system is obtained. At that time, when the embedding dimension is properly selected within a range equal to or larger than an original dimension of the attractor, it is known that this vector stream shows same property as an original movement.

On the other hand, the correlation dimension exponent C(r) in Step 503 can be obtained through Equation 3:

$$C(r) = \frac{1}{N^2} \sum_{i=1}^{n} \sum_{j=1}^{n} (f(r - |X_i - X_j|)) \quad (3)$$

At that time, the correlation dimension exponent C(r) is obtained while increasing the embedding dimension until the correlation dimension exponent C(r) is saturated. Here, 'r' represents the radius of the embedding dimension. With reference to the correlation dimension exponent C(r) obtained while increasing the embedding dimension, a log-log graph for the radius r of the embedding dimension and the correlation dimension exponent C(r) is prepared, and then a gradient of the log—log graph is decided as the fractal dimension exponent for the image quality of the display device (Step 504). Here, the gradient of the log-log graph for the radius r of the embedding dimension and the correlation dimension exponent C(r) can be calculated using various approximate expressions. In the present invention, a case that the gradient is calculated by using a regression method being a kind of approximate expression will be explained below.

In this case, the gradient can be calculated through Equation 4, as follows. The gradient obtained from such an approximate expression is selected as the fractal dimension exponent:

$$y_i = \alpha + \beta x_i + \varepsilon_i \text{ (with } i = 1, 2, 3, \ldots, n) \quad (4)$$

$$\hat{\beta} = \frac{\sum_{i=1}^{n}(x_i - \bar{x})(y_i - \bar{y})}{\sum_{i=1}^{n}(x_i - \bar{x})^2} = \frac{n(\sum xy) - (\sum x)(\sum y)}{n(\sum x^2) - (\sum y^2)}$$

$$\hat{\alpha} = \bar{y} - \hat{\beta}\bar{x} = \frac{\sum y}{n} - \hat{\beta}\frac{\sum x}{n}$$

$$\hat{y} = \hat{\alpha} + \hat{\beta}x$$

On the other hand, for each display device used for the measurement of uniformity of image quality, the fractal dimension exponent calculated through such a series of procedure is as shown in Table 1 below.

TABLE 1

| Display device | Fractal dimension exponent | Saturation embedding dimension | Image quality estimation order | |
|---|---|---|---|---|
| | | | By the experienced | According to the present invention |
| #1 | 3.683 | 22 | 3 | 4 |
| #2 | 3.558 | 22 | 4 | 3 |
| #3 | 2.932 | 23 | 1 | 1 |
| #4 | 3.097 | 15 | 2 | 2 |
| #5 | 3.659 | 21 | 5 | 5 |

The foregoing Table 1 shows "fractal dimension exponent," "saturation embedding dimension," and "image quality order," which are produced for each of the display devices (#1–#5) for which the image quality measurement is performed. Here, the fractal dimension exponent is to represent a level of uniformity of image quality for each of the display devices. At that time, in deciding the level of uniformity of image quality for each of the display devices, it is estimated that the lower the fractal dimension exponent is, the lower the complexity of image quality for the display device is and the higher the uniformity of image quality is.

In other words, according to data as shown in Table 1, it can be seen that the fractal dimension exponent of a third display device (#3) is 2.932 which is the smallest value, and accordingly, it can be estimated that the third display device has the best uniformity of image quality. On the contrary, it can be seen that the fractal dimension exponent of a fifth display device (#5) is 3.659 which is the largest value, and accordingly, it can be estimated that the fifth display device has the worst uniformity of image quality.

As described above, the level of uniformity of image quality for each of the display devices can be represented as numerical values (i.e., quantified). Accordingly, since the subjective of humans does not intervene in the decision on the level of uniformity of image quality, an objective and fair decision method can be provided.

In addition, referring again to Table 1, it can be seen that the result of image quality estimation by the naked eye of the experienced is similar to the result of image quality estimation by the image quality analysis method for the display device using the fractal dimension according to the present invention. Merely, it can be seen that the result of the estimation by the experienced and the result of image quality estimation by the image quality analysis method according to the present invention are switched to each other in the estimation for a first display device (#1) and a second display device (#2).

Such a switch can be construed to mean a tolerance in the image quality analysis method according to the present invention or in the estimation by the naked eye of the experienced. Further, as shown in Table 1, it can be seen that a difference between the fractal dimension exponent for the first display device and that for the second display device is not large.

Figure 7:
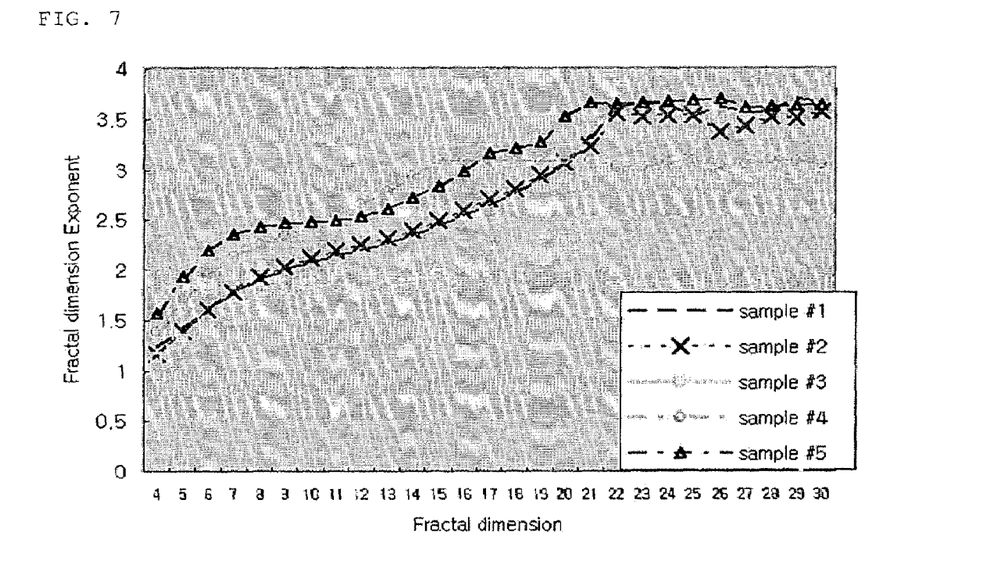
FIG. 7 is a graphical view showing a relationship between the fractal dimension and the fractal dimension exponent calculated from the image quality measurement data for a plurality of display devices through an image quality analysis method for the display device using the fractal dimension according to an exemplary embodiment of the present invention.

Moreover, of items as shown in Table 1, "saturation embedding dimension" is for showing that the data for measurement of image quality for each of the display devices represent the chaos phenomenon. This saturation-embedding dimension is shown in FIG. 7. FIG. 7 is a graphical view showing a relationship between the fractal dimension and the fractal dimension exponent calculated from the image quality measurement data for a plurality of display devices through an image quality analysis method for the display device using the fractal dimension according to an exemplary embodiment of the present invention.

As described above, according to an image quality analysis method and system for the display device using the fractal dimension according to the present invention, an objective estimation can be performed for the display device by quantifying the image quality of the display device by objective numerical values. In addition, according to an image quality analysis method and system for the display device using the fractal dimension according to the present invention, it is possible to propose an objective and fair evaluation criterion between manufacturers and purchasers of the display device by quantifying the uniformity of image quality of the display device by numerical values.

It will be apparent to those skilled in the art that various modifications and variations can be made in the image quality analysis method and the image quality analysis system of the present invention without departing from the spirit or scope of the invention. Thus, it is intended that the present invention cover the modifications and variations of this invention provided they come within the scope of the appended claims and their equivalents.

What is claimed is:

1. An image quality analysis method for a display device, comprising the steps of:
    outputting an image pattern for analysis of an image quality of the display device;
    dividing a screen display region to which the image pattern is output into a plurality of sub-regions;
    producing measurement data representing the image quality with respect to each of the plurality of sub-regions;
    arranging the produced measurement data as a time series;
    obtaining a fractal dimension exponent from the data as a time series; and
    evaluating the fractal dimension exponent as a level of uniformity of the image quality of the display device.

2. The image quality analysis method according to claim 1, wherein the image pattern for analysis of the display device is output as a half gray image pattern type for an entire screen.

3. The image quality analysis method according to claim 1, wherein the produced measurement data includes luminance data measured from the plurality of sub-regions using a luminance meter.

4. The image quality analysis method according to claim 3, wherein the luminance meter includes a two-dimensional CCD luminance meter.

5. The image quality analysis method according to claim 1, wherein the produced measurement data includes chromaticity data measured from the plurality of sub-regions using a calorimeter.

6. The image quality analysis method according to claim 5, wherein the colorimeter includes a two-dimensional CCD colorimeter.

7. The image quality analysis method according to claim 1, wherein the produced measurement data includes color difference data produced from luminance data and chromaticity data measured from the plurality of sub-regions using a luminance meter and a colorimeter, respectively.

8. The image quality analysis method according to claim 1, wherein the screen display region is divided into pixel units and the measurement data are produced for the pixel units.

9. The image quality analysis method according to claim 1, wherein the screen display region is divided into pixel units and the measurement data is produced for each of the pixel units, each of the pixel units being located at a prescribed equal interval from a respective reference pixel.

10. The image quality analysis method according to claim 1, wherein the step of arranging the produced measurement data as a time series includes the step of arranging a value (X) of the data for measurement of image quality from the plurality of sub-regions to be data on time series (X(t), X(2t), . . . , X(Nt)) with respect to a prescribed time interval (t).

11. The image quality analysis method according to claim 10, wherein the step of obtaining the fractal dimension exponent includes the steps of:
    constructing the arranged data on time series to be a n-dimensional vector stream Xi={X(t+i−1), X(t+i−1+T), X(t+i−1+2T), . . . ,X(t+i−1+(n−1)T}, where, i=(1−m)T with i being a positive number, and m=N−(n−1) with a predetermined delay time (T);
    reconstructing each vector of the n-dimensional vector stream to be 1 to p embedding dimension vectors using an embedding theorem;
    obtaining a correlation dimension exponent, C(r), while increasing the embedding dimension for each of the embedding dimension vectors;
    and obtaining an embedding dimension radius, r, at a point at which the correlation dimension exponent is saturated; and
    determining a gradient from a log-log graph for the embedding dimension radius and the correlation dimension exponent with reference to the correlation dimension exponent obtained while increasing the embedding dimension, the gradient representing the fractal dimension exponent.

12. The image quality analysis method according to claim 11, wherein the delay time (T) is an integral number of times of the prescribed time interval (t).

13. The image quality analysis method according to claim 11, wherein when the gradient of the log-log graph for the embedding dimension radius and the correlation dimension exponent is obtained, a regression method is used.

14. The image quality analysis method according to claim 1, wherein in the step of determining the fractal dimension exponent as a level of uniformity of the image quality, a lower fractal dimension exponent corresponds with at least one of a lower image quality complexity and a higher uniformity of image quality.

15. The image quality analysis method according to claim 1, wherein the display device includes a liquid crystal display.

16. An image quality analysis system for a display device of which image quality is to be analyzed, comprising:
   image acquisition means for detecting optical data of an image to be displayed from the display device;
   data processing means for producing measurement data representing the image quality of the display device using the optical data detected by the image acquisition means and for constructing the produced measurement data as a time series; and
   exponent calculating means for obtaining a fractal dimension exponent of the display device using the time series constructed by the data processing means.

17. The image quality analysis system according to claim 16, wherein the image acquisition means includes a CCD luminance meter/colorimeter.

18. The image quality analysis system according to claim 16, wherein the measurement data produced by the data processing means includes luminance data.

19. The image quality analysis system according to claim 16, wherein the measurement data produced by the data processing means includes chromaticity data.

20. The image quality analysis system according to claim 16, wherein the measurement data produced by the data processing means includes color difference data calculated from luminance data and chromaticity data.

21. The image quality analysis system according to claim 16, wherein the display device includes a liquid crystal display.

22. A method of analyzing image quality for a display device using the image quality analysis system according to claim 16.

23. An image quality analysis system for a display device of which image quality is to be analyzed, comprising:
   an image acquisition device to detect optical data of an image to be displayed from the display device;
   a data processor to produce measurement data representing the image quality of the display device using the optical data detected by the image acquisition device and to construct the produced measurement data as a time series; and
   an exponent calculator to obtain a fractal dimension exponent of the display device using the time series constructed by the data processor.

24. A method of analyzing image quality for a display device using the image quality analysis system according to claim 23.

* * * * *